(12) United States Patent
Tribotte

(10) Patent No.: US 7,837,214 B2
(45) Date of Patent: Nov. 23, 2010

(54) REAR FORK FOR BICYCLE

(76) Inventor: Pascal Tribotte, 64, rue de Montreuil, Versailles (FR) 78000

(*) Notice: Subject to any disclaimer, the term of this patent is extended or adjusted under 35 U.S.C. 154(b) by 359 days.

(21) Appl. No.: 11/814,332

(22) PCT Filed: Jan. 19, 2006

(86) PCT No.: PCT/FR2006/050025
§ 371 (c)(1),
(2), (4) Date: May 29, 2008

(87) PCT Pub. No.: WO2006/077346
PCT Pub. Date: Jul. 27, 2006

(65) Prior Publication Data
US 2008/0258425 A1 Oct. 23, 2008

(30) Foreign Application Priority Data
Jan. 19, 2005 (FR) .................................. 05 50155

(51) Int. Cl.
*B62K 19/00* (2006.01)
*B62K 25/00* (2006.01)

(52) U.S. Cl. ....................... 280/284; 280/283

(58) Field of Classification Search ................ 280/275, 280/283, 284, 285; 180/227
See application file for complete search history.

(56) References Cited

U.S. PATENT DOCUMENTS

| 5,282,517 | A | | 2/1994 | Prince |
| 5,901,974 | A | * | 5/1999 | Busby et al. ................ 280/284 |
| 6,056,307 | A | | 5/2000 | Busby et al. |
| 6,244,610 | B1 | | 6/2001 | Kramer-Massow |
| 6,488,301 | B2 | * | 12/2002 | Klassen et al. .............. 280/284 |
| 2004/0145149 | A1 | * | 7/2004 | Ellsworth et al. ........... 280/284 |
| 2006/0071444 | A1 | * | 4/2006 | Griffiths ..................... 280/283 |

FOREIGN PATENT DOCUMENTS

FR 2 762 572 10/1998

* cited by examiner

*Primary Examiner*—Tony H. Winner
*Assistant Examiner*—Marc A Scharich
(74) *Attorney, Agent, or Firm*—Oblon, Spivak, McClelland, Maier & Neustadt, L.L.P.

(57) ABSTRACT

A rear fork for a bicycle, including a brake caliper support, mounted in rotation about the axle of the rear wheel and a hub carrier, fixed to the wheel axle, including a lower arm connected at a first end to the hub carrier and at a second end to the frame of the bicycle, and an upper arm, extending from the hub carrier to the frame. A connector link is arranged between the brake caliper and the lower arm, and the distance between the point of connection of the connector link on the lower arm and the connection of the lower arm to the hub carrier is at least equal to a third of the distance between the connection of the lower arm to the hub carrier and the connection of the lower arm to the frame.

8 Claims, 1 Drawing Sheet

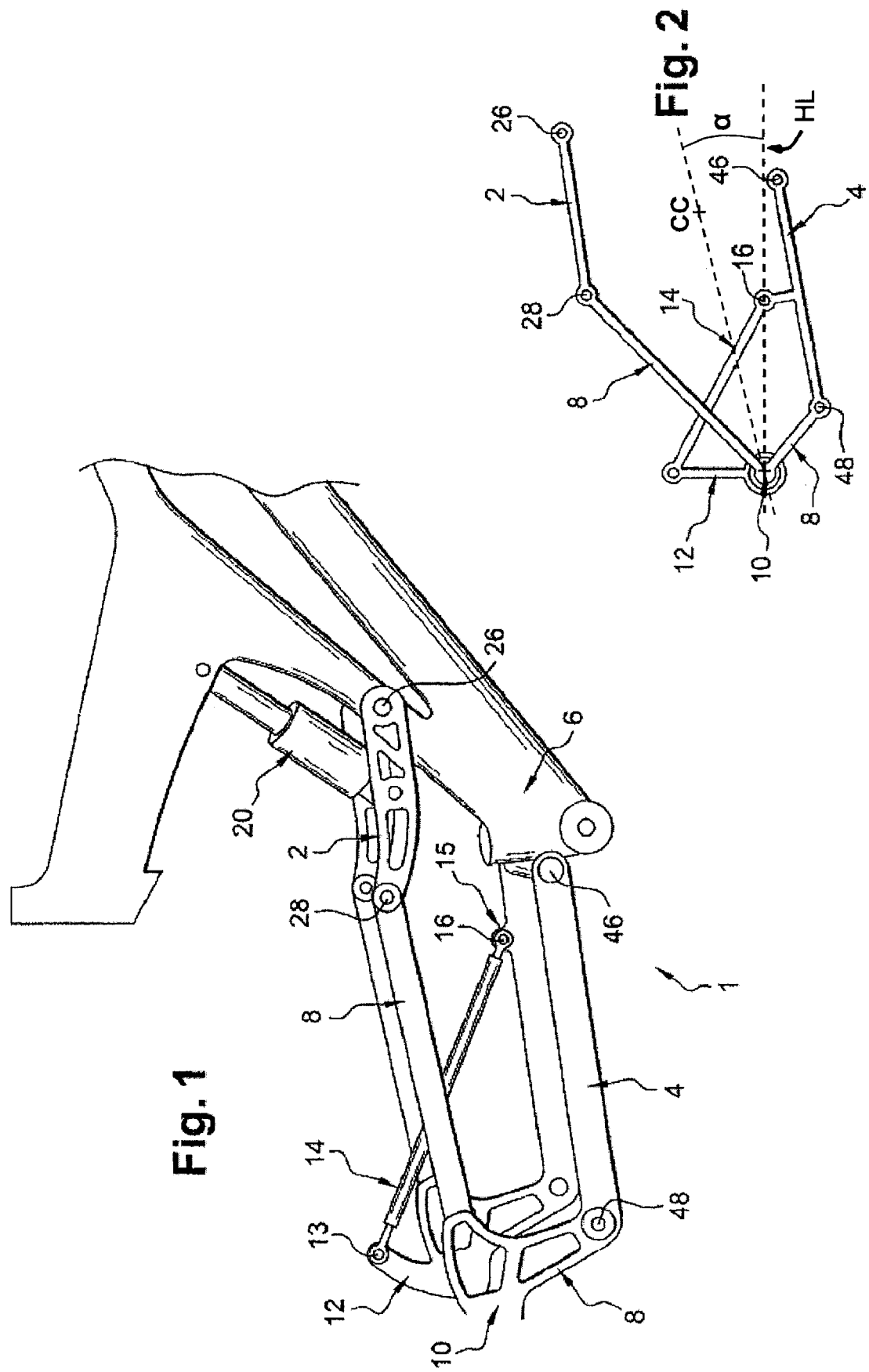

REAR FORK FOR BICYCLE

BACKGROUND

The present invention relates to a bicycle rear end assembly and more particularly to a rear end assembly comprising at least one brake caliper support which is mounted to rotate about the rear wheel axle and a hub carrier which is secured to this rear wheel axle, and comprising at least one lower arm which is articulated at a first end to a hub carrier and at a second end to the bicycle frame, and an upper arm which extends from the hub carrier to the frame.

In known embodiments, floating calipers are rotationally mounted around the rear wheel axle. The caliper surrounds the braking track on the disk, in the manner of a vise, and it is the disk which moves in order to be centered in the caliper.

Document FR 2 762 572 discloses a bicycle rear suspension characterized in that various elements of this suspension are arranged in such a way that frame efficiency is maintained during pedaling. The driving power of the bicycle is thus optimized without the feared effects of pumping in order also to optimize the behavior of the frame under braking, it may be envisioned for a floating caliper to be added to the rear end assembly equipped with such a suspension.

BRIEF SUMMARY

One of the objectives of the invention is therefore to propose an improvement to a rear end assembly in order to offer the bicycle on which this rear end assembly is mounted optimum mountain-biking behavior both in terms of braking and under pedaling.

In response to constraints invariably found in industry, the present invention also needs to be inexpensive and occupy very little space.

In order to meet these objectives, the invention proposes a rear end assembly for a bicycle as described previously characterized in that a link is positioned between the brake caliper support and the lower arm and in that the distance between the point of articulation of the link to the lower arm and the point of articulation of the lower arm to the hub carrier is at least equal to one third of the distance between the point of articulation of the lower arm to the hub carrier and the point of articulation of the lower arm to the frame.

According to various features of the present invention:

the point of articulation of the link to the lower arm is positioned very close to the bicycle frame, the upper arm supports a shock absorber device, the vertices of the articulated quadrilateral defined by the lower arm, the hub carrier, the upper arm and the frame are arranged in such a way that the straight line passing through the axis of rotation of the rear wheel hub, on the one hand, and the center of curvature of the path of said hub during suspension travel on the other hand, makes an angle ranging between 10° and 20° with a horizontal line running parallel to the longitudinal mid-plane of the bicycle.

BRIEF DESCRIPTION OF THE DRAWINGS

Other features and advantages of the invention will become apparent from reading the detailed description which follows, for an understanding of which reference will be made to the attached drawings in which:

FIG. 1 is a perspective view of a bicycle rear end assembly according to one embodiment of the invention.

FIG. 2 is a diagrammatic depiction of the rear end assembly depicted in FIG. 1

DETAILED DESCRIPTION

As depicted in FIGS. 1 and 2, a bicycle rear end assembly 1 comprises at least one upper arm 2, which supports a shook absorber device 20, and a lower arm 4, which is in the form of a fork able to be positioned on each side of the rear wheel of the vehicle. The upper arm 2 is articulated to part of the bicycle frame 6, the corresponding point of articulation 26 being situated higher up on the frame than the point of articulation 46 corresponding to the articulation of the lower arm 4 to the frame 6. The other end 28 of the upper arm 2 is articulated to a hub carrier 8, which rotates as one with the axle 10 of the rear wheel which has not been depicted. Likewise, the other end 48 of the lower arm 4 is articulated to this hub carrier 8. Thus, the rear wheel is connected to the frame 6 by an articulated structure defining a quadrilateral. This articulated quadrilateral, which is contained in a substantially longitudinal vertical mid-plane of the bicycle, comprises the points of articulation 26, 28, 48, 46 and the sides 2, 8, 4, 6.

A brake caliper support 12 is mounted to rotate about the axle 10 of the rear wheel which has not been depicted. A link 14 is mounted at a first end on this support 12 and at a second end on the lower arm 4. The purpose of this floating caliper, which is made up of the caliper support 12 and the link 14, is to react on the lower arm 4 to cause the brake caliper to rotate and thus cause the hub carrier 8 to rotate. Compressive forces are also induced in the rear suspension, something which is a sought-after effect during braking.

The position of the point of articulation 16 of this link 14 on the lower arm 4 is calculated such that this point of articulation 16 lies between the points of articulation 46 and 48 of the lower arm 4 on the frame 6 and the hub carrier 8 respectively. In addition, the distance between the point of articulation 16 of the link 14 to the lower arm 4 and the point of articulation 48 between the hub carrier 8 and the lower arm 4 is at least equal to one third of the distance between the two points of articulation 46 and 48 of the ends of the lower arm. This ratio makes it possible to avoid positioning the articulation of the link 14 too close to the hub carrier 8, as this would amount to practically securing the caliper support 12 to the hub carrier 8.

The link 14 extends from the floating caliper support 12 to the lower arm 4, and a fixing lug 13 is formed on the support 12 to accept the articulation of the end of the link 14 likewise, a fixing lug 1' is formed on the lower arm 4 to accept the second articulation of the end of the link 14, and these two fixing lugs 13 and 15 are positioned in such a way that the link 14 can extend inside the fork that forms the hub carrier 8, without impeding the rotation of the rear wheel which has not been depicted.

As seen earlier, the fact of bringing the point of articulation 16 of the link 14 to the lower arm 4 very close to the frame 6 makes it possible to cause compression of the suspension and of the frame under braking. As depicted in FIGS. 1 and 2, the link 14 is advantageously fixed to the lower arm 4. This fixing to the lower arm 4 has the advantage of being a simple and inexpensive embodiment. However, it must be understood that this link 14 may be fixed directly to the frame 6 without departing from the scope of the invention.

This effect is advantageously combined with the suspension system disclosed in document FR 2 762 572 in order to combine the performance under pedaling with the performance under braking. In effect, the position and length of the link 14 are designed to allow the articulated quadrilateral defined by the lower arm (43), the hub carrier (8), the upper arm (2) and the frame (6) Thus, the vertices (26, 28, 46, 46) of this articulated quadrilateral are arranged in such a way that the straight line (line CC in FIG. 2) passing through the axis of rotation of the rear wheel hub, on the one hand, and the center of curvature of the path of said hub during suspension travel, on the other hand, makes an angle (α in FIG. 2) ranging between 10° and 20° with a horizontal line (line HL in FIG. 2) running parallel to the longitudinal mid-plane of the bicycle.

Advantageously, this angular value, when the bicycle suspension is compressed under the self-weight of the cyclist and of the bicycle, is between 11 and 13°. It will be understood that such values are obtained once the shock absorber device 20 has undergone initial adjustment to tailor it to suit the weight of the cyclist. This adjustment is performed stationary, with the cyclist sitting on the saddle of the bicycle.

The invention is not in any way restricted to the embodiment described and illustrated, which was given merely by way of example.

The invention claimed is:

1. A bicycle rear end assembly comprising:
   at least one brake caliper support mounted to rotate about a rear wheel axle;
   a hub carrier secured to the rear wheel axle;
   at least one lower arm articulated at a first end to the hub carrier and at a second end to a frame of the bicycle;
   an upper arm extending from the hub carrier to the bicycle frame;
   a link positioned between the brake caliper support and the lower arm,
   wherein a distance between a point of articulation of the link to the lower arm and a point of articulation of the lower arm to the hub carrier is at least equal to one third of a distance between the point of articulation of the lower arm to the hub carrier and a point of articulation of the lower arm to the bicycle frame.

2. The rear end assembly as claimed in claim 1, wherein the point of articulation of the link to the lower arm is positioned close to the bicycle frame.

3. The rear end assembly as claimed in claim 2, wherein the upper arm supports a shock absorber device.

4. The rear end assembly as claimed in claim 3, wherein vertices of an articulated quadrilateral defined by the lower arm, the hub carrier, the upper arm, and the bicycle frame are configured such that a straight line passing through an axis of rotation of a rear wheel hub and a center of curvature of the path of the rear wheel hub during suspension travel makes an angle ranging between 10° and 20° with a horizontal line running parallel to a longitudinal mid-plane of the bicycle.

5. The rear end assembly as claimed in claim 1, wherein the upper arm supports a shock absorber device.

6. The rear end assembly as claimed in claim 5, wherein vertices of an articulated quadrilateral defined by the lower arm, the hub carrier, the upper arm, and the bicycle frame are configured such that a straight line passing through an axis of rotation of a rear wheel hub and a center of curvature of the path of the rear wheel hub during suspension travel makes an angle ranging between 10° and 20° with a horizontal line running parallel to a longitudinal mid-plane of the bicycle.

7. The rear end assembly as claimed in claim 1, wherein vertices of an articulated quadrilateral defined by the lower arm, the hub carrier, the upper arm, and the bicycle frame are configured such that a straight line passing through an axis of rotation of a rear wheel hub and a center of curvature of the path of the rear wheel hub during suspension travel makes an angle ranging between 10° and 20° with a horizontal line running parallel to a longitudinal mid-plane of the bicycle.

8. The rear end assembly as claimed in claim 2, wherein vertices of an articulated quadrilateral defined by the lower arm, the hub carrier, the upper arm, and the bicycle frame are configured such that a straight line passing through an axis of rotation of a rear wheel hub and a center of curvature of the path of the rear wheel hub during suspension travel makes an angle ranging between 10° and 20° with a horizontal line running parallel to a longitudinal mid-plane of the bicycle.

* * * * *